(Model.)

A. T. CEFREY.
FLORIST'S FIGURE.

No. 407,331. Patented July 23, 1889.

Witnesses:
John A. Lyon
E. M. Marshall

Inventor:
Arsène Theodore Cefrey.
pr Lemuel P. Jenks. atty.

UNITED STATES PATENT OFFICE.

ARSÈNE THEODORE CEFREY, OF BOSTON, MASSACHUSETTS.

FLORIST'S FIGURE.

SPECIFICATION forming part of Letters Patent No. 407,331, dated July 23, 1889.

Application filed January 10, 1889. Serial No. 295,993. (Model.)

*To all whom it may concern:*

Be it known that I, ARSÈNE THEODORE CEFREY, a citizen of the Republic of France, and now residing at the city of Boston, in the county of Suffolk and State of Massachusetts, have invented new and useful Improvements in Florists' Figures, (being letters and other characters,) of which the following is a specification.

The nature of my invention is that of a letter or series of letters and other appropriate characters stamped or otherwise fashioned out of a slab or sheet of leather-board (or other appropriate substance) covered with a closely-adhering coat of colored sawdust and flock mixed, (preferably,) and then with an adherent coat of colored "immortelles" or "everlasting" flowers reduced to their constituent leaves or petals and fastened to a "cushion" or a wreath by a device similar to a hair-pin; and the object is to provide a cheap and attractive device, not easily frangible or removable from the cushion, of letters forming a chosen word or of appropriate characters for mortuary, ornamental, or other purposes.

Figure 1:
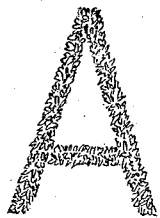
Figure 2:
Figure 3:

In the drawings, Figure 1 is a view in elevation of one of my letters, being the letter "A." Fig. 2 is a similar view of another letter "T". Fig. 3 is a similar view of a third letter "C", and Fig. 4 a like view of a device for fastening the letters to a cushion or frame. These letters are all to be fastened supposably to a cushion or to a circle representing a wreath, the said circle or wreath made, in the manner usual with florists, of a wire frame and the characters held thereto by the device shown in Fig. 4, which is a narrow strip of sheet metal or a piece of flattened wire treated in a peculiar manner and formed into the shape of an ordinary hair-pin.

The old mode of presenting flowers to the eye in the form of bunches or bouquets on the occasion of the celebration of a marriage, rejoicings at births, at funerals, at welcomes on a return, at political and numerous other occasions is fast being superseded to a great extent by the arrangement of flowers in masses of different shapes covering, say, a cushion, (made as mentioned above,) which cushion bears also a word or words in easily-legible characters, (as "Good Luck" for a marriage, "Welcome" for a birth or a return, "Rest" for a funeral, &c.,) or a representation of some insignia, (such as a compass and square, where an organization of Freemasons is concerned,) or many other forms and characters which need not be particularized. We will take as a type of all these devices the letters of the American alphabet. The mode of making these letters (which mode was first invented and practiced by the present applicant) heretofore used is to bend up fine iron wire—say to form the letter "H"—into two thin bunches of equal length to form the upright lines, then winding one end of a third wire round the middle of one of these bunches and placing the other column or upright line at a proper distance, cross the third wire over to it and fasten the same thereto by winding, letting the third wire go back and forth till a rough semblance is presented of the horizontal line of an "H." The wire is then bound round with a slender piece of pack-thread or twine, the fingers of the operator while thus binding holding close to the wires blossoms, appropriately dyed, of the everlasting flower, (the *Helichrysum arenarium,*) some of which, falling between the wire and the pack-thread, are there permanently retained. The rough appearance presented by the device at this stage is partially improved by a second binding of fine wire above and around the flowers, which are thus still more firmly held to the wire bunches. A fourth piece of fine wire is then wound at its middle round the center of the letter (or character) and the two ends protruding at the back of the letter cut off with a pair of scissors to a convenient length to answer for sticking the letter to a cushion. The thing, such as it is, is now finished. Clumsy and inartistic, more or less distorted in shape, and requiring the greatest care in handling, both the process and the product need improvement. Experienced hands are needed to make the letters, &c., in the way described, and every new device—a foul anchor or a cross and crown, &c.—if any novelty is wanted in the design, must practically be newly invented. The expense of labor is thus great, and as a woman can make generally only eighty letters per day in the manner described it is readily seen that an improvement is needed. This improvement in the manufacture of an article in very great and constantly-increasing demand I have made, and it is the subject of this patent.

I take a sheet of any rigid, stiff, and tenacious substance, preferably leather-board, and by means of stamps (or in other ways) cut out, for example, a letter—say the letter "A," as shown in Fig. 1. I use any color; but, supposing that I prefer to have the product of a purple color, I take a mixture of fine sawdust and "flock" dyed purple and dried, and, after giving a coating of cement, glue, or analogous sticking substance to the cut-out letter, powder it over thinly with the sawdust and flock and dry the whole. I then take a light substance of a flocculent character, for which purpose I prefer the separate petals of the flower of the everlasting or immortelles, (the *Helichrysum arenarium*,) prepared by first dyeing the whole flowers of the desired color, thoroughly drying them, dyeing after rubbing them to pieces, and sifting them in a sieve to remove any stems or other impurities. I complete the coating of the leather-board letter with another coating of cement or glue and then powder it over with the flower-leaves. I sometimes dispense with the sawdust coating, and instead thereof add a pigment of any desired color to my cement of the first coating, and before the cement is dry add my flower-leaves, the object of the use of the sawdust being simply that when the flower-leaves are by friction accidentally detached the inappropriately-colored surface of the leather-board shall not meet the view. On being dried the letter or other character is finished. I use a water-proof cement to give permanence to the adhesion of the flower-petals to the letters, &c. These figures are the product under my patent. Permanently perfect in form, fit to be handled without special care, much lighter than the wire-frame figures, and made at less than one-twentieth their expense, they seem to need no further improvement. Of these devices from two to three thousand can be made in a day by a single operator.

Figure 4:

To fasten the letters, &c., onto the cushion, I use a wire, preferably flattened, or, better, a narrow strip cut from sheet metal bent, as shown in Fig. 4, in the form of a hair-pin (and by the same machinery) and pointed at the loose ends, placed so as to straddle any portion of the letter, (say the center, as in Figs. 1 and 2,) the lower pointed ends of the fastening-pins being thrust into the cushion. Sometimes I use more than one fastening-pin, as in Fig. 3, where three are used. Before using them I coat the tops or bent part at the outside with cement and then touch them to a pile of the prepared immortelles-petals, which adhere, after the cement is dried, tenaciously to the pin. Thus when the pin is in use its presence is not discovered.

I do not confine myself to the use of the immortelles flower alone, sometimes using the camomile flower or the aster or other flowers of those families, preferring those with small petals. I include in my definition in my claim of "florists' figures" all such figures used by florists as may be produced by stamping from a sheet of material, whether letters in various styles—such as "script" letters, &c.—or symbols—such as harps, crosses, swords, &c.—and I can use for the production of my letters and symbols pieces of wood veneer, two or more of the thin sheets being cemented together, with the grain of each sheet crossing that of the next sheet to prevent warping, the wood steamed to softness, and then stamped out like the leather-board.

I claim—

A florist's figure stamped from a sheet of material, appropriately colored, and having an adhesive coating covered with a flock made of fragments of flowers more or less comminuted, substantially as described.

ARSÈNE THEODORE CEFREY.

Witnesses:
LEMUEL P. JENKS,
FRANCIS COPELAND.